United States Patent Office 2,874,720
Patented Feb. 24, 1959

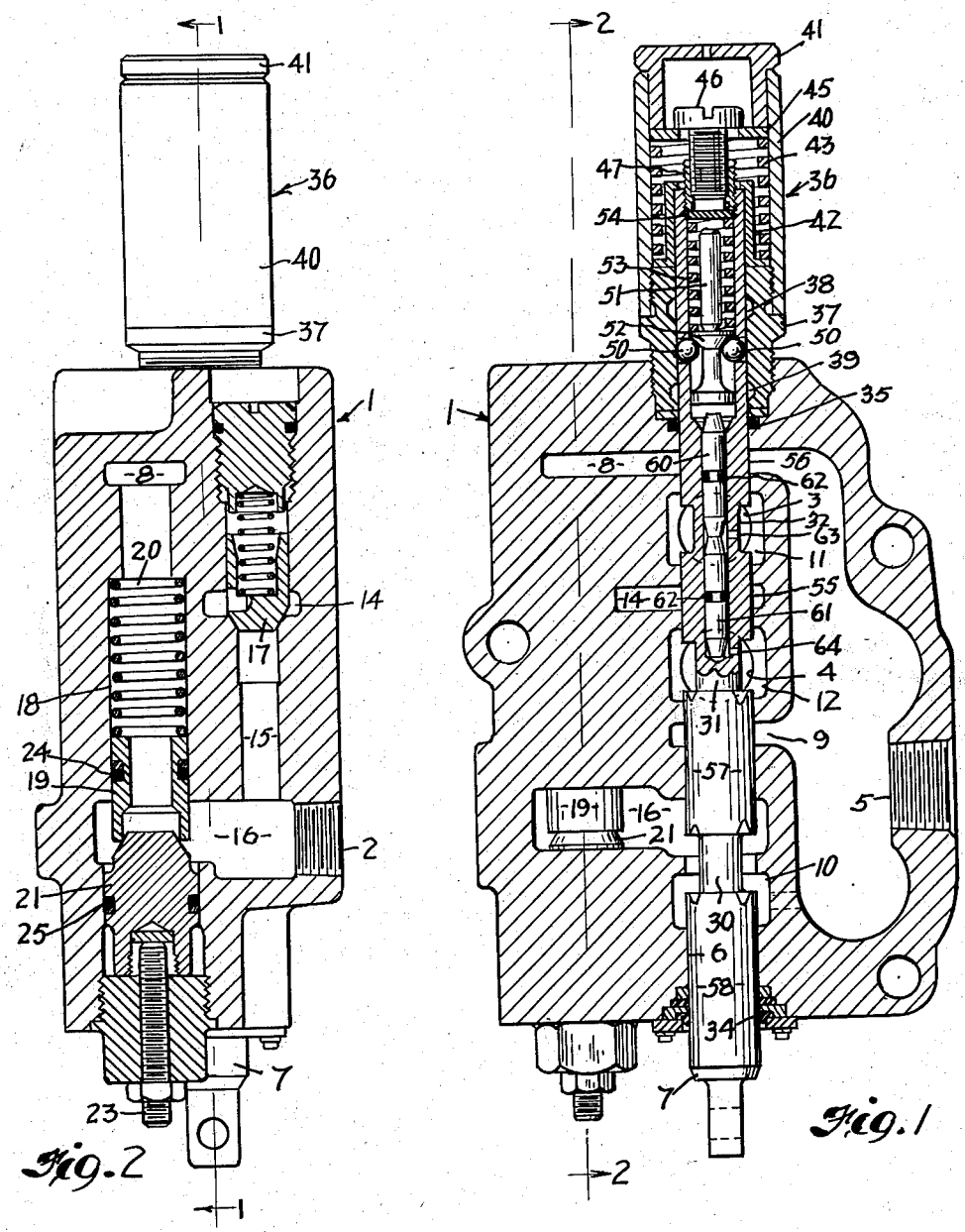

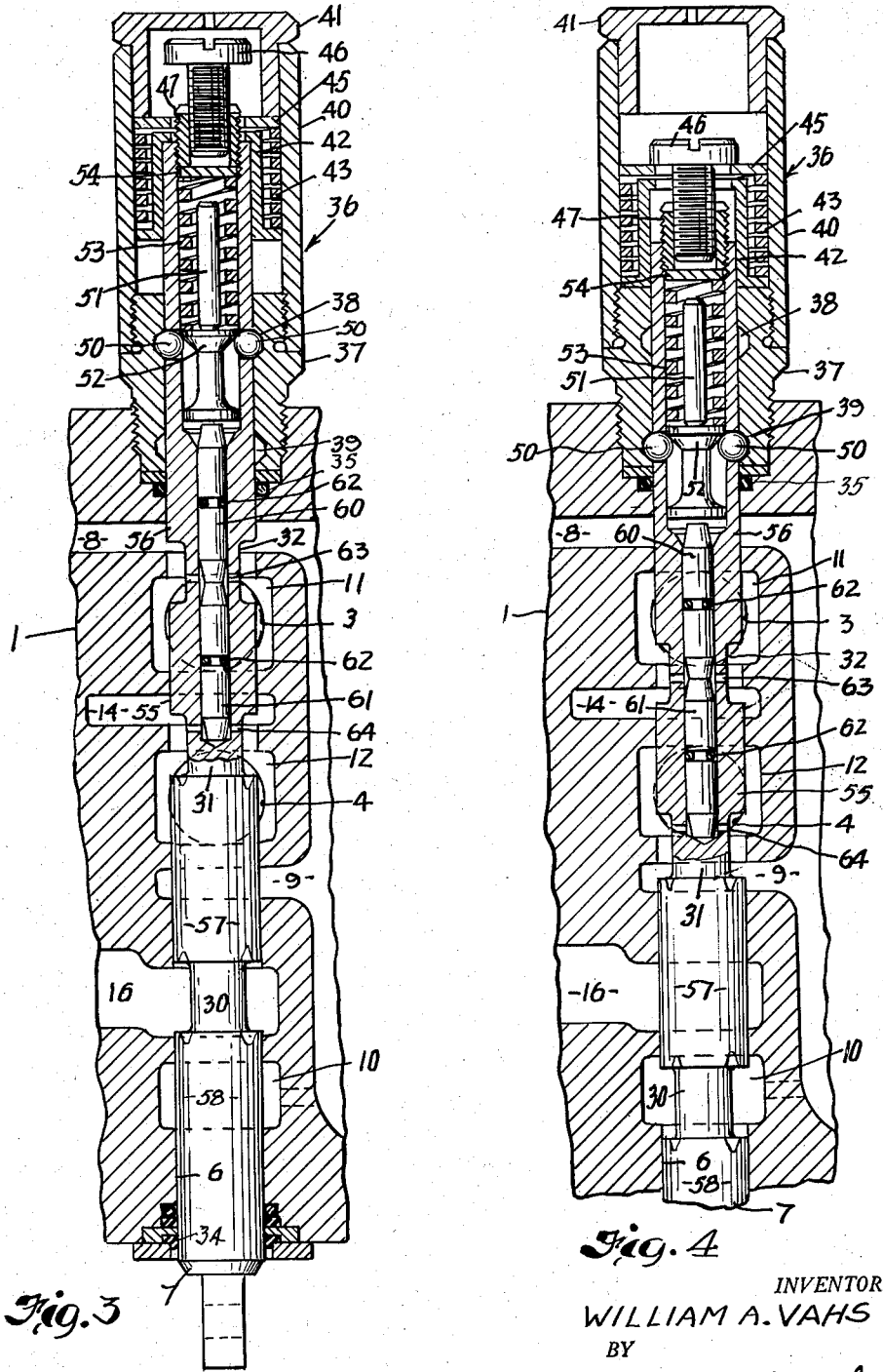

2,874,720

VALVE ASSEMBLY

William A. Vahs, Euclid, Ohio, assignor to Parker-Hannifin Corporation, a corporation of Ohio Application February 14, 1957, Serial No. 640,185

8 Claims. (Cl. 137—622.5)

This invention relates generally as indicated to a valve assembly and more particularly, to a valve assembly which is adapted for controlling the actuation of a fluid motor, or like component of a fluid pressure system.

In the control of a fluid motor, it has been found desirable, with the view of simplification of the fluid system and its operation, to provide a motor control valve which, when actuated from a neutral or "off" position to a selected operating position, is latch held in the selected position until such time that a latch release member permits the valve to automatically return to neutral position. One manner of achieving this result is to provide a motor control valve that has fluid pressure actuated latch or detent release mechanism associated therewith so arranged that when pressure builds up in the system owing to the movable element of a fluid motor reaching the end of its stroke or a stop position, such increased pressure activates the latch release member whereby a valve return spring may restore the valve to neutral position. However, such control valves, as presently known, for use in connection with double-acting fluid motors are unduly complex in structure because of the necessity of providing in each a plurality of latched operating positions to which the movable valve member therein is selectively moved to control the direction of actuation of the movable element of the motor.

Accordingly, it is a primary object of this invention to provide a simple, fool-proof, and efficient form of control valve of the character indicated which is adapted for use in connection with the control of a double-acting fluid motor.

Another object of this invention is to provide a valve assembly of the character indicated in which the valve member return spring and the detent mechanism are embodied in a separate housing unit that is detachably secured to the main valve body and that is operatively associated with one end only of the movable valve member, for example, a reciprocating spool, leaving the other end of said valve member free for connection with a simple camless pivoted operating lever.

It is another object of this invention to provide a self-contained valve assembly of the character indicated, in which there is provided not only the motor control valve assembly and its associated spring return and detent mechanisms, but in addition, has incorporated therein other necessary fluid system components such as a relief valve to prevent build-up of excessive fluid pressure in the fluid system and a check valve in the fluid pressure delivery passage which permits flow of fluid through the valve assembly in one direction only, that is, from a pressure inlet port to a selected outlet or service port which, in the case of a valve assembly designed for use with a double-acting fluid motor, is one of two outlet ports connected with ports of said motor.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of one of the various ways in which the principle of the invention may be employed.

In said annexed drawings:

Fig. 1 is a cross-section view of an illustrative embodiment of the present invention, such section having been taken along the longitudinal axis of the movable valve member as indicated by line 1—1, Fig. 2;

Fig. 2 is a cross-section view taken substantially along the line 2—2, Fig. 1 showing in detail the relief and check valves that are associated with the present valve assembly; and Figs. 3 and 4 are fragmentary cross-section views showing the movable valve member herein a spool valve in its respective operating positions, said valve member being held in either position by a detent mechanism until such mechanism is released by a fluid pressure operated detent release.

In the embodiment of the invention herein shown for purpose of illustration, the main valve body 1 is preferably a metal casting that is formed with an inlet port 2 adapted for connection with a source of fluid under pressure; with two service or outlet ports 3, 4 that are respectively adapted for connection with the ports of a double-acting fluid motor, and with a tank or return port 5 by way of which the fluid displaced by the motor is adapted to be returned to a tank or sump for re-circulation. Said valve body 1 has a bore 6 therethrough in which a valve spool 7 is slidably mounted to control flow of fluid in a manner to be described. Said bore 6 is intersected at axially spaced intervals by cord passages of which the passages 8, 9, and 10 lead to the tank port 5, of which the passages 11 and 12 lead to the respective outlet ports 3 and 4, and of which the passage 14 leads to the inlet port 2 via passages 15 and 16 and spring-seated check valve 17, the last-mentioned passage 16 also intersecting bore 6 to by-pass fluid from inlet port 2 to tank port 5 via passages 16 and 10 when the valve spool 7 is in neutral or "off" position as shown in Fig. 1.

Said valve body 1 is also formed with another bore 18 which communicates by way of the passage 16 with the inlet port 2 and such bore 18 having mounted therein a relief valve 19 which herein is shown as being of tubular form and urged by the spring 20 against the adjustable seat plug 21, it being evident that when the adjusting screw 23 is turned, the consequent movement of said plug 21 changes the force which spring 20 exerts to hold valve 19 in seated position. Whenever the fluid pressure in the inlet port 2 and passage 16 builds up to a value sufficient to raise valve 19 from said seat plug 21, fluid will flow through said valve 19, through bore 18, and through return passage 8 to the tank port 5. The valve 19 and plug 21 are equipped with suitable packing rings 24 and 25.

Basically, the spool valve 7 is of more or less conventional form including alternate lands and necks of which neck 30 communicates the passage 16 with by-pass passage 10 when said spool valve 7 is in the neutral or "off" position as shown in Fig. 1, of which neck 31 selectively communicates the inlet passage 14 with one of the outlet passages 12 or 11 as shown in Figs. 3 and 4 respectively, and of which neck 32 selectively communicates the other of said outlet passages 11 or 12 with the tank passage 8 or 9 as shown in Figs. 3 and 4 respectively.

As is conventional practice, the lands of said spool valve 7 are a close sliding fit in the bore 6 of the valve body 1 and the ends of said spool valve are sealed by suitable packings 34 and 35 to prevent external leakage of fluid, it being noted that such packings are never exposed to the high pressure of the fluid in the inlet port 2 but instead, only to the much lower pressure which is present in the tank port passages 8 and 10.

One end of said spool valve 7, herein the lower end, is formed for pivotal connection of an operating lever (not shown) thereto. The upper end of said spool valve 7 is hollow and extends upwardly into a spring return and detent housing assembly 36, one part 37 of which is screwed into valve body 1 and is formed with a pair of annular grooves or undercuts 38 and 39. Another part 40 of said housing 36 is threaded onto said part 37 and has brazed or otherwise secured thereto a vented closure cap 41.

Fitted over the upper end of said spool valve 7 is a flanged sleeve 42 having a top inturned flange that engages the upper end of said spool valve 7 and a bottom outturned flange that engages the upper end of said part 37 under the influence of a spring 43 compressed between said outturned flange and a washer 45 that abuts the end of cap member 41. The top side of said washer 45 is engaged by the head of a screw 46 that has threaded engagement in an adjusting screw 47, the latter, in turn, being screwed the upper end of said spool valve 7.

As now can be seen, the spring 43 serves to yieldably hold the spool valve 7 in the neutral position as shown in Fig. 1, since upward movement of said spool valve is yieldably resisted by spring 43 acting downwardly on the outturned flange of sleeve 42, and downward movement of said spool valve is yieldably resisted by spring 43 acting upwardly on the washer 45 and on the head of screw 46.

The hollow upper end portion of said spool valve 7 is formed with lateral openings through the wall thereof, preferably two or more openings being provided, such openings carrying radially movable balls 50 and being located intermediate the grooves 38 and 39 when said spool valve is in the neutral position of Fig. 1. Reciprocably mounted in the hollow end of said spool valve is a detent cam member 51 formed with a frusto-conical cam surface 52 that engages said balls 50 and tends to move the latter radially outward under the influence of spring 53, said spring 53 being adjustably compressed between the head of detent cam member 51 and the disc 54 that abuts the lower end of the previously referred to adjusting screw 47.

When the spool valve 7 is in the neutral or "off" position, as shown in Fig. 1, fluid under pressure in the inlet port 2 and passage 16 freely flows past the neck 30 into the return passage 10 and port 5 while the land 55 (between necks 31 and 32) blocks communication of the inlet passage 14 with both of the outlet ports 3 and 4, and while the lands 56 and 57 block communication of outlet ports 3 and 4 with the respective return passages 8 and 9. Assuming that it is desired to cause fluid under pressure in the inlet port 2 and passages 16, 15, and 14 to flow through the service port 4 into a fluid motor and to permit the fluid displaced by the motor to flow into the other service port 3 to the tank or return port 5, the valve spool 7 will be moved upwardly to the Fig. 3 position where the land 58 closes fluid communication between the inlet and return passages 16 and 10, the neck 31 establishes fluid communication between the inlet passage 14 and the outlet passage 12 to service port 4 and the neck 32 establishes fluid communication between the passages 11 and 8 from the other service port 3 and tank port 5. In this position of the valve spool 7, the balls 50 are brought into alignment with the top groove 38 whereupon the downward pressure of spring 53 on cam member 51 forces the detent balls 50 outwardly into engagement with such groove 38. The detent balls 50 thus serve to hold or latch the spool valve 7 in its upper operating position, the return spring 43 being compressed and ready to return the spool valve 7 downwardly to its neutral position upon release of outward pressure of cam surface 52 on said balls. When the spool valve 7 is moved downward from the neutral position of Fig. 1 to the other operating position as shown in Fig. 4, the by-pass from the inlet passage 16 to the return passage 10 is closed by the land 57 and the neck 32 establishes communication between the inlet passage 14 and the passage 11 to the service port 3 whereas the fluid displaced by the motor is permitted by neck 31 to flow through passages 12 and 9 from the other service port 4 to the return port 5. In that position of the spool valve 7, the cam member 51 presses the detent balls 50 outwardly into the bottom groove 39 to hold or latch the spool valve 7 in that position preparatory to shifting to the neutral position upon release of outward pressure on said balls 50. It is noted that the return spring 43 is compressed to effect such return of the spool valve 7 upwardly to the neutral position.

A novel feature of the present invention is the provision of detent release elements carried in the spool valve 7 itself, herein such elements being in the form of tandem plungers 60 and 61 each of which is provided with a sealing ring 62. The neck 32 is provided with a passage 63 leading into the space between said plungers 60 and 61 and the neck 31 is also formed with a passage 64 leading to the lower end of the bottom plunger 61.

Referring again to Fig. 3, when the spool valve 7 is in the position there shown and when the pressure of the fluid in the inlet and outlet passages 14 and 12 builds up to a predetermined value, owing, for example, to the movable element of the motor reaching the end of its stroke or reaching a stop position or encountering a heavy load, such increased pressure will, through opening 64, act upwardly on the lower end of the bottom plunger 61, thereby moving both plungers 60 and 61 upwardly, the upper end of the top plunger 60 engaging the lower end of the cam member 51. At the time that such pressure overcomes downward force of spring 53 on cam member 51, the latter is raised by plungers 60 and 61 to release the outward pressure against the detent balls 50, whereupon the return spring 43 will be effective immediately to move the spool valve 7 downwardly and thus move the balls 50 inwardly out of engagement with the groove 38. Such downward movement of the spool valve 7 continues until the lower end of the sleeve 42 abuts the upper end of the part 37, the spool valve 7 then being in its neutral position as shown in Fig. 1.

On the other hand, when the spool valve 7 is in the latched operating position as shown in Fig. 4, the fluid at increased pressure in the inlet and outlet passages 14 and 11 enters spool valve 7 through opening 63 and acts to move only the top plunger 60 upwardly to again raise the cam member 51 with respect to the spool valve 7 whereupon the upward pressure exerted on the spool valve 7 by the return spring 43 causes the detent balls 50 to be moved inward and out of engagement with the bottom groove 39, again, the spring 43 returning the spool valve 7 to the neutral position as determined by the engagement of the washer 45 with the bottom end of the cap 41.

In order that such increased pressure may properly act on the bottom end of plunger 61 or on the bottom end of plunger 60 as the case may be, said plungers are formed with tapered ends and preferably the plungers 60 and 61 are identical whereby they may be assembled in spool valve 7 without regard to which one is inserted first and without regard to end-to-end disposition thereof.

In conclusion, it can be seen that the present invention is simple in structure and is fool-proof and efficient in operation, provision being made for adjustment of the pressure at which the release of the detent mechanism occurs, and once having made the adjustment, it remains substantially constant whether both of the detent release plungers 60 and 61 are moved upwardly together or only the top one 60 is moved with respect to the bottom one 61. Moreover, the entire return spring and detent mechanisms are associated with only one end of the spool valve 7 thereby resulting in a simplified structure that leaves the other end free for connection with an actuator. Likewise, the provision of detent releases 60 and 61 housed within the spool valve 7 prevents interference with free flow characteristics of the spool valve and enables the use of a shorter spool valve as compared with one in which release plungers are added to the ends.

Other modes of applying the principle of the invention may be employed, change being made as regards the details described, provided the features stated in any of the following claims, or the equivalent of such, be employed.

I, therefore, particularly point out and distinctly claim as my invention:

1. A valve assembly comprising a body formed with a bore intersected by passages at axially spaced intervals, a spool valve axially reciprocable in such bore to control flow of fluid through such passages, said spool valve being tubular at one end, and being formed with at least one lateral opening through the wall thereof, a detent element radially movably fitted in such opening, said body being formed with a plurality of axially spaced apart recesses with which said detent registers in selected axial positions of said spool valve in said body, a spring-actuated cam member axially movable in the tubular end of said spool valve to yieldably move said detent outwardly into a recess when said spool valve is axially shifted in said body, a fluid pressure actuated detent release also axially movably carried within the tubular end of said spool and effective, when actuated, to move said cam member to a position permitting inward movement of said detent out of such recess, and a return spring bearing on the tubular end of said spool valve to axially shift said spool valve, upon release of said detent as aforesaid, to a position wherein said detent is out of register with said recesses, said detent release comprising tandem plungers having abutting ends and remote ends, such fluid pressure in different selected positions of said spool valve acting on the abutting end of one plunger to move said plunger toward said cam member and acting on the remote end of the other plunger to similarly effect movement of said one plunger through such abutting ends.

2. The valve assembly of claim 1 wherein said return spring is effective to so shift said spool valve in opposite directions to a positive whereat said detent is between such recesses.

3. A valve assembly comprising a body formed with a bore, and with an inlet port adapted for connection with a source of fluid under pressure, a pair of service ports adapted for connection with a double acting fluid motor, and a return port adapted for connection with a fluid supply tank; a spool valve reciprocable in such bore, such bore being intersected axially therealong by passages leading to said ports, said spool valve and body being cooperatively arranged so that in a neutral position of said spool valve fluid communication between said inlet port and said service ports is blocked while fluid communication is established between said inlet port and said return port to provide a fluid by-pass, and so that in two operating positions to opposite sides of such neutral position fluid communication is established selectively between said inlet port and one service port and between the other service port and said return port while in either operating position said fluid by-pass is closed; a detent mechanism associated with one end of said spool valve effective to hold the latter in either operating position; a fluid pressure-actuated detent release means responsive to build up of fluid pressure in the selected service port to release said detent mechanism; and a return spring acting on said spool valve to restore the latter to neutral position upon release of said detent mechanism, said release means comprising a pair of abutting release members movably carried by said valve member and arranged so that when one release member is moved it releases said detent mechanism as aforesaid, said valve member being formed with passages to conduct fluid pressure from a selected service port to act on the respective release members to move said one release member either directly by fluid pressure acting thereon or through the other release member by fluid pressure acting on the latter.

4. A valve assembly comprising a body formed with an inlet port and at least two outlet ports to which it is desired to selectively supply fluid under pressure from said inlet port; a spool valve member supported in said body for axial movement from a neutral position blocking fluid communication between said inlet port and said outlet ports to operating positions selectively establishing fluid communication between said inlet port and either one of said outlet ports; a fluid pressure actuated detent mechanism including a ball detent effective to hold said valve member in either operating position until released by pressure of fluid in the selected outlet port, a spring-actuated cam member urging said detent to valve member holding position, return means effective to return said valve member to neutral position when thus released, and a fluid pressure actuated detent release means axially movably carried by said valve member and comprising a pair of tandem plungers one of which moves said cam member to release said ball detent from said valve member responsive to fluid pressure in one outlet port acting between said plungers and responsive to fluid pressure in the other outlet port acting on and moving the other of said plungers.

5. A valve assembly comprising a body formed with an inlet port and at least two outlet ports to which it is desired to selectively supply fluid under pressure from said inlet port; a valve member supported in said body for movement from a neutral position blocking fluid communication between said inlet port and said outlet ports to operating positions selectively establishing fluid communication between said inlet port and either one of said outlet ports; a fluid pressure actuated detent mechanism including holding means effective to hold said valve member in either operating position until released by pressure of fluid in the selected outlet port, return means effective to return said valve member to neutral position when thus released, and a pair of abutting fluid pressure actuated detent release members movably carried by said valve member and arranged so that when one release member is moved it engages said holding means to thus release said valve member for movement to neutral position by said return means, said valve member having separate passages to conduct fluid under pressure from a selected outlet port to act on the respective release members to move said one release member either directly by fluid pressure acting thereon or through the other release member by fluid pressure acting on the latter.

6. The valve assembly of claim 5 wherein said release members comprise tandem plungers.

7. The valve assembly of claim 5 wherein said valve member is a spool valve movably carrying said release members therewithin.

8. The valve assembly of claim 5 wherein said holding means comprises detents, and a spring-actuated cam member urging said detents to valve member holding position, and wherein said one release member moves said cam member to detent releasing position.

References Cited in the file of this patent

UNITED STATES PATENTS

| 2,499,072 | McClure | Feb. 28, 1950 |
| 2,594,664 | Livers et al. | Apr. 29, 1952 |
| 2,617,445 | Elder | Nov. 11, 1952 |